Nov. 9, 1965  F. C. JACOB ETAL  3,216,568
METHOD AND APPARATUS FOR SORTING OBJECTS
Filed Dec. 6, 1962

INVENTORS
FREDERIC C. JACOB
ROGER J. ROMANI
CLYDE M. SPROCK
BY *Lippincott, Ralls & Hendrickson*
ATTORNEYS

United States Patent Office 3,216,568
Patented Nov. 9, 1965

3,216,568
METHOD AND APPARATUS FOR SORTING OBJECTS
Frederic C. Jacob and Roger J. Romani, Davis, and Clyde M. Sprock, West Sacramento, Calif., assignors to The Regents of the University of California, Berkeley, Calif., a corporation of California
Filed Dec. 6, 1962, Ser. No. 242,676
6 Claims. (Cl. 209—111.7)

This invention relates to a method and apparatus for sorting or classifying objects according to the delayed light emission characteristics exhibited. It provides a simple method of grading certain fruits and vegetables on the basis of stage of ripeness. The ability to select quickly and accurately all items in a given group that meet a certain standard, and to reject all others, can be extremely important in situations where harvesting is done automatically (by machine or tree-shaking, for example), so that it becomes necessary to separate the items ready for marketing from the remainder.

In the past many different methods have been employed to attempt this function. Some of these most frequently encountered have used spectro-photometric measurement of reflected or transmitted light; or mechanical means for pressure testing (for softness); or mechanical sorters (for size); or a number of different destructive sampling methods, some of which have depended upon chemical tests (for sugar content, etc.). None of these has proven entirely satisfactory, for each has its own disadvantages: the optical-electrical equipment required for photometric measurement is usually very complex, as well as employing expensive prisms, diffraction gratings, filters, and the like; pressure- and size-testing devices are not always accurate, since maturity need not be a function of these criteria; and destructive methods, by their very nature, are subject to all the inherent error in sampling techniques.

The method and apparatus of this invention employ an entirely different principle, namely that certain substances, notably the green pigment of plant chlorophyll, have markedly characteristic behavior in delayed light emission.

Certain substances exhibit a glow or emission of light following excitation by exterior light. The emission may involve a series of energy exchange reactions and is called delayed light emission (DLE), a term which includes, but is not limited to, such effects as phosphorescence and chemiluminescence. The amount of source energy needed for exciation and saturation, as well as the initial intensity and the exponential fade rate of the discharge, are characteristic for each substance. Some materials lose their initial intensity very quickly, others more slowly. It has now been surprisingly discovered that in spite of the fact that chlorophyll itself does not exhibit DLE, green chlorophyll-bearing plant material exhibits this property to a considerable degree. This factor provides a basis for ascertaining the degree of maturity of many fruits and vegetables. Mature (ripe) specimens contain little or no chlorophyll, and exhibit little DLE; immature (unripe or "green") ones contain more; hence, measurement of the DLE intensity provides a simple, yet reliable, means of determining which specimens are to be accepted and which rejected. It is necessary only to ascertain the characteristic DLE intensity of the particular degree of maturity desired.

In brief, the invention provides a method and apparatus for exposing objects to light; with fruits and vegetables, light having a component in the wavelength range of about 2,000–10,000 A. is used. In some separations, ultraviolet or infrared light may alternatively be employed.

The essential requirement for the light source is that it have a component in the excitation spectrum of at least some of the objects to be sorted. The objects are then passed into a dark chamber where, after a suitable delay, the intensity of their DLE is measured. A photocell is used for this measurement. All specimens having less than the critical DLE are passed on as "accepted," since they do not sufficiently energize the photocell; those reaching or exceeding the critical DLE intensity do energize it, thereby causing a simple mechanical deflector to push them aside into the "rejected" group.

The method and apparatus of the invention may be better understood from the following more detailed despription and the accompanying drawings, in which.

Figure 1:
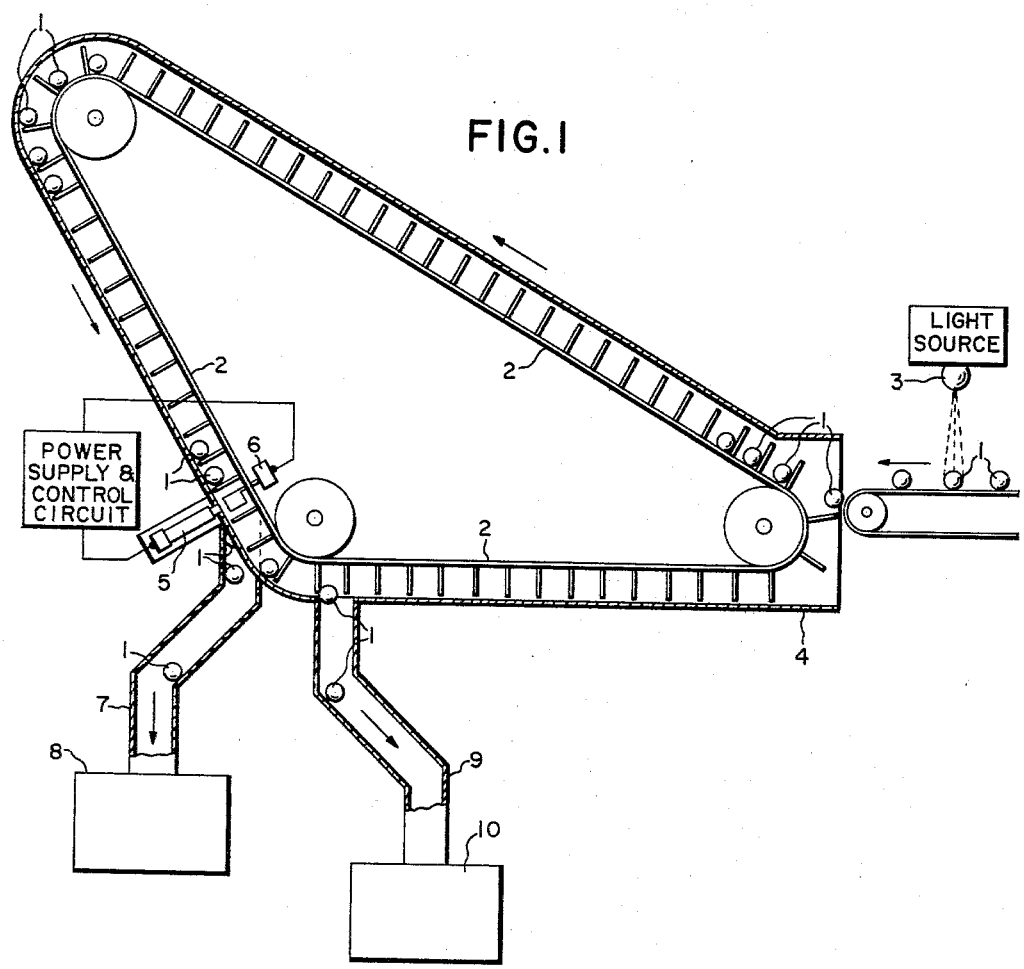
FIG. 1 is a schematic representation of the apparatus of this invention.

Referring now to FIG. 1, the specimens 1 to be sorted—lemons or tomatoes, for example—are placed on a conveyor belt 2 which carries them at a constant forward speed past visible light source (stimulus) 3 into a dark chamber or tunnel 4. Light source 3 has a component in the wavelength range of visible light, preferably within 4,000–8,000 A., if the specimens to be sorted are plant materials. As explained above, the nature of this light source will vary depending upon the excitation spectrum of the objects sorted. Toward the far end of this tunnel 4, the objects pass a photocell 5, which is adjusted in a conventional manner to close a switch (not illustrated) whenever the DLE intensity reaches or exceeds the desired value. When the switch is closed, a solenoid in deflector 6 is energized, causing it to drop the specimens through an opening in chamber 4 into a "reject" chute 7 leading to reject container 8. On the other hand, whenever the DLE intensity of the specimen passing photocell 5 does not reach the critical value, photocell 5 is not sufficiently energized, and the specimen continues along conveyor belt 2 until it reaches "accepted" chute 9 and "accepted" container 10.

Conveyor belt 2 and reject chute 7 are conventional conveyor belts moving at constant speed, and need no further explanation here. Light source 3 may be any convenient source providing the necessary stimulus or excitation for the desired DLE. Usually, a source somewhat stronger than ambient light is preferred, either fluorescent or incandescent. The sole requirement for separating chlorophyll-bearing objects is that the light have a component in the excitation spectrum of chlorophyll, i.e., from about 4,000–8,000 A. Most general illumination sources, particularly those which appear white or near-white, will be found suitable.

Preferably, the objects should be exposed to the saturation point; in this way, maximum excitation is achieved, and accurate DLE detection is facilitated. The total amount of light required to induce the DLE to the saturation point is a product of the source intensity and the exposure time. An incandescent lamp providing 30 foot-candles of illumination at a color temperature of 3100° K. provides measurable excitation in 0.01 second, and requires approximately 0.5 second to saturate. At higher excitation levels, the time is, of course, reduced. An electronic flash lamp, for example, produces near-saturation excitation in 2 microseconds. The exposure time of the objects is controlled very simply by the steadily moving conveyor belt, which can travel past the light source at the desired rate of speed.

The desired time delay after exposure for optimum measurement of the DLE is also regulated by the speed of the conveyor belt. A suitable length of travel is chosen so that the photocell 5 may be placed at a sufficient distance from the tunnel entrance and light source to avoid any undesired excitation by extraneous light. The conveyor belt speed then determines the time of the delay. The precise value of this time delay is seldom critical, but the optimum value will be found to vary with different kinds of specimens, or even with the same kind under different conditions. An average value will generally lie in the range between one second and one minute. For lemons or tomatoes, for example, it lies in the range of 5–10 seconds, with little change in result occasioned by variations within these limits.

Photocell 5 and solenoid and deflector 6, with their attendant mechanisms, are conventional. The amount of light required to energize the photocell sufficiently to actuate the solenoid can be adjusted, usually in an associated amplifier, in a conventional manner to set the reject-level of the apparatus.

Figure 2:
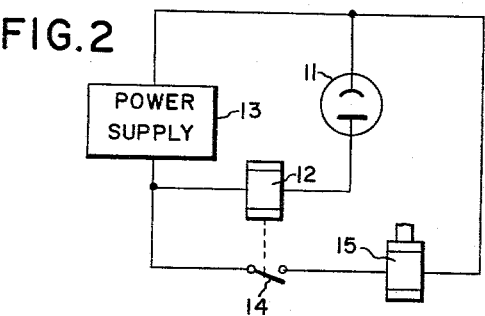
FIG. 2 is a somewhat schematic block diagram showing the electrical connection of the apparatus.

The electric circuit used in the above apparatus is shown in FIG. 2. The photocell 11 is connected (through an amplifier not shown) to a relay 12 and a power supply 13. When the photocell is energized (as a result of a sufficient DLE intensity from the specimen passing before it), relay 12 is energized, closing contact 14 and causing solenoid 15 to be actuated. This results in deflection of the object passing before the photocell 11 into container 8.

Many different kinds of specimens may be sorted by the method of this invention. In addition to separation on the basis of ripeness, plant specimens containing chlorophyll may be sorted from those not containing it. For example, the method is useful for separating chlorophyll-bearing fruits from clods of earth, or rocks or other mineral matter which can resemble them closely in appearance, where the fruit can produce more DLE than the rocks. The photocell or its associated amplifier may be adjusted, by conventional means, to select any desired intensity of DLE as critical. All specimens reaching or exceeding this critical value are rejected; all others are passed on.

The method of the invention is particularly useful where it is not possible to determine visually the degree of maturity present in a fruit. Plums, for example, may have such intense overriding color in their skins that ripeness cannot be estimated with any certainty; but the method of this invention can easily separate ripe plums from unripe ones, even though their appearance may be identical.

Nor is the invention limited to segregation of chlorophyll-containing materials, i.e., fruits and some vegetables. It is applicable to any other materials having differences in DLE fade-rate characteristics. Certain mineral-bearing rocks, for example, can be separated from other rocks because of the difference in their DLE fade rates. In addition, various color pigments have been observed to differ in their DLE fade characteristics; the method of this invention may therefore be used for testing paints or painted objects, in order to identify those having a desired DLE characteristic.

Another embodiment of the invention uses several photocell-deflector assemblies situated at different lengths along a conveyor belt, for grading into several classifications on one "run." As the objects progress past photocells set for different DLE levels, the ones having the lowest DLE intensity (i.e., the ripest) will travel farthest down the line before being deflected.

The method of the invention will be seen to have striking advantages over the prior art. Instead of the cumbersome equipment required in optical-electrical devices based on reflection or transmission of light (due in part to the necessity of shielding the measuring and detecting apparatus from the light source), the photocell 5 is here removed both in space and in time from light source 3, and hence no elaborate shielding is required. Moreover, there is a complete absence of complicated prisms, filters, diffraction gratings, and the like—a photocell energizing a solenoid is all that is necessary. Fruits and the like generally lose chlorophyll as they mature. This provides a reasonable basis on which to perform measurements for segregating fruits into maturity classifications by a nondestructive method.

The method of the invention is clearly illustrated by the following example; however, this example is included merely to show in detail one embodiment of the invention, and is not, therefore, to be construed as placing further limitations on the scope of the invention as claimed.

*Example*

A batch of lemons of various degrees of ripeness was loaded on a belt such as the one shown in FIG. 1. A 30 foot-candle incandescent lamp having a color temperature of 3100° K. was used to provide excitation; this lamp was located in close proximity to the belt and fruit. The conveyor belt speed was regulated so that the lemons remained exposed to the light for at least 0.5 second. After excitation, they passed on through a dark chamber for about 10 more seconds. At the end of this time, they passed in front of a photocell which, when sufficiently energized by light, caused a solenoid to actuate a switch which deflected the lemons into a separate chute. The setting of the photocell (which fixes the amount of light required to energize a relay providing power to the solenoid) was determined empirically by first running a few lemons through and examining the rejected ones carefully for ripeness. If really ripe lemons were being rejected, the setting was adjusted so that more light (indicating more chlorophyll) was required to energize the relay; if unripe lemons were being passed, the amount of light required to energize the relay was reduced so that those lemons having less chlorophyll (the riper ones) were passed. Once the desired sorting point was ascertained, the apparatus successfully sorted suitably ripe lemons from the others.

Many other modifications and adaptations may be made by those skilled in the art in the invention as described above, which are still within its spirit and scope. Therefore, the only limitations to be placed on the scope of the invention are those expressed in the following claims.

What is claimed is:

1. A method of separating ripe fruit having a lower intensity delays light emission from unripe fruit having a higher intensity which comprises:
    exposing all of said fruit to visible light;
    after a fixed time delay, measuring the intensity of the delayed light emission of each piece of said fruit;
    establishing a critical delayed light emission intensity corresponding to a predetermined degree of fruit ripeness; and
    separating the pieces of unripe fruit having an intensity of delayed light emission above the pre-selected critical value from those pieces of ripe fruit having a lower intensity.

2. A method of sorting objects having different delayed light emission characteristics which comprises:
    exposing said objects to visible light of sufficient intensity and for a sufficient time to substanially produce a saturation level for delayed light emission;
    passing said objects through a dark chamber and maintaining the objects therein for a predetermined delay time;
    measuring the intensity of the delayed light emission of each of said objects by photoelectric detection at the end of said delay time; and
    separating the objects having an intensity of delayed light emission above a predetermined intensity from those which have a lower intensity.

3. The method of claim 2 wherein said objects comprise plant material and said delay time is from about 1 second to 1 minute.

4. The method of claim 3 wherein said wavelength range is between about 5,000 and 7,000 A.

5. Apparatus for sorting objects having different delayed light emission characteristics comprising:
- a light source emitting light having a wavelength in the excitation spectrum of at least some of said objects with a sufficient intensity of light to substantially saturate objects for delayed light emission;
- a conveyor belt moving past said light source and adapted to carry objects to be sorted for illumination of these objects;
- an elongated light-tight tunnel through which said conveyor passes carrying objects previously illuminated;
- light-responsive means viewing a limited portion of said conveyor in said tunnel a predetermined spaced distance from the entrance of the tunnel and having a variable actuation threshold for incident light to produce signals at predetermined minimum levels of delayed light emission of passing objects;
- means controlling the velocity of travel of said conveyor belt to thereby establish a controllable delay time between illumination of objects and viewing of objects by the light-responsive means; and
- separating means operating upon objects on said conveyor on the opposite side of said light-responsive means from the tunnel entrance and connected for actuation by said signals from the light-responsive means to separate objects in accordance with their delayed light emission characteristics.

6. A method of sorting chlorophyll-bearing plant materials in accordance with the amount of chlorophyll therein, which comprises:
- exposing said materials to light having wavelengths in the range of 2,000 A. to 10,000 A.;
- after the same predetermined time delay for each of the materials, measuring the intesity of the delayed light emission of each of said materials;
- establishing at least one minimum level of measured light intensity; and
- separating the materials having an intensity of delayed light emission above said minimum level from those having a lower intensity to thereby separate materials having a greater amount of chlorophyll from those having a lesser amount of chlorophyll.

References Cited by the Examiner

UNITED STATES PATENTS

| | | | |
|---|---|---|---|
| 2,717,693 | 10/55 | Holmes | 209—111.5 |
| 2,894,626 | 7/59 | Mulders | 209—111.5 |
| 2,951,164 | 8/60 | Timms. | |

ROBERT B. REEVES, *Primary Examiner.*